United States Patent [19]

Brimhall

[11] Patent Number: 5,516,249

[45] Date of Patent: May 14, 1996

[54] EXOSKELETON WITH KINESTHETIC FEEDBACK AND ROBOTIC CONTROL

[75] Inventor: Owen D. Brimhall, South Jordan, Utah

[73] Assignee: Technical Research Associates, Inc., Salt Lake City, Utah

[21] Appl. No.: 241,157

[22] Filed: May 10, 1994

[51] Int. Cl.⁶ .................................................. B25J 3/04
[52] U.S. Cl. .................................. 414/5; 364/806
[58] Field of Search .................... 414/5; 364/806

[56] References Cited

U.S. PATENT DOCUMENTS

| | | | |
|---|---|---|---|
| 3,263,824 | 8/1966 | Jones et al. | 414/5 |
| 4,302,138 | 11/1981 | Zarudiansky | 414/5 |
| 5,143,505 | 9/1992 | Burdea et al. | 414/5 |
| 5,184,319 | 2/1993 | Kramer | 901/34 X |

*Primary Examiner*—Donald W. Underwood
*Attorney, Agent, or Firm*—J. Winslow Young

[57] ABSTRACT

A control apparatus and method for controlling a remote actuator, the control apparatus having a kinesthetic feedback system for providing a kinesthetic sensation to the operator as a physical sensation representative of the resistive forces encountered by the remote actuator. The control apparatus is configured to be releasably mounted to the hand of the operator with control modules supported at preselected joints of the hand. The control modules sense changes in the angular orientation in the respective joints and generate a control signal as a function of the change. This control signal is used to drive the corresponding actuator. Each actuator includes a sensor to sense resistive forces encountered by the actuator and generate a response signal as a function of the resistive forces. A magnetostrictive clutch mechanism on the control module is controlled by the response signal to provide a resistive force against movement of the control module thereby providing a kinesthetic sensation to the hand of the operator.

10 Claims, 4 Drawing Sheets

EXOSKELETON WITH KINESTHETIC FEEDBACK AND ROBOTIC CONTROL

BACKGROUND

1. Field of the Invention

This invention relates to exoskeletal apparatus for robotic control and, more particularly to a novel exoskeleton apparatus and method with kinesthetic feedback for robotic control.

2. The Prior Art

Robotic devices are designed to perform certain functions at remote locations under the command of either a person or a computer located at a separate location. Ideally, a human-operated robotic device will not only accurately follow the commands of the human operator but will also feed back to the human a replica of the forces encountered by the robotic device as though the human were performing the tasks of the robotic device. This feedback is known as kinesthetic feedback and is essential for the accurate manipulation of a robotic device. The importance of kinesthetic feedback can be illustrated by the simple experiment of lacing one's shoes while wearing thick gloves. The task becomes virtually impossible if one is also wearing a blindfold. Removal of the gloves provides the person with all of the tactile sensations of the hands so that it is a relatively simple task to lace or tie the shoes even while continuing to wear the blindfold.

This simple experiment readily demonstrates the value of kinesthetic feedback. Research has shown that task speed and other performance measures are increased significantly when kinesthetic feedback is added to visual feedback in the operation of a robotic device. However, the problem is one of providing the operator with a kinesthetic feedback system that is readily adaptable into an exoskeletal control system for robotic manipulation.

In view of the forgoing it would be an advancement in the art to provide a novel exoskeleton for robotic control having kinesthetic feedback to provide the operator with a realistic tactile sensation of the forces encountered by the robotic device controlled by the exoskeleton. Another advancement in the art would be to provide a dexterous, intuitive feedback system to enable the operator to experience the forces encountered by the robot whether these forces are amplified in the case of microscopic robots or attenuated in the case of large robots. Such a novel apparatus and method is disclosed and claimed herein.

BRIEF SUMMARY AND OBJECTS OF THE INVENTION

The present invention involves an exoskeletal control system mounted to a framework into which a hand may be inserted to manipulate the exoskeletal control system. Each joint of the framework has an actuator mounted thereto to provide kinesthetic feedback to the hand of the operator. The actuator is configured as a clutch-like member that impedes further motion of the joint as a function of the forces encountered by the remote robotic device. The clutch-like member is driven by a magnetostrictive element, the electromagnetic coil of which receives electrical signals representative of the forces encountered by the remote robotic device.

It is, therefore, a primary object of this invention to provide improvements in kinesthetic feedback to an exoskeletal control system.

Another object of this invention is to provide improvement in the method of providing kinesthetic feedback to an exoskeleton control system.

Another object of this invention is to provide a magnetostrictive driving mechanism for creating a restrictive force against motion of a sensor module on the exoskeletal framework, the degree of restrictive force being a function of the degree of resistive force encountered by the robotic element controlled by the sensor module.

Another object of this invention is to provide a kinesthetic feedback to a sensor module that is proportional to the forces encountered by the robotic element controlled by the sensor module.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENT

Figure 1:
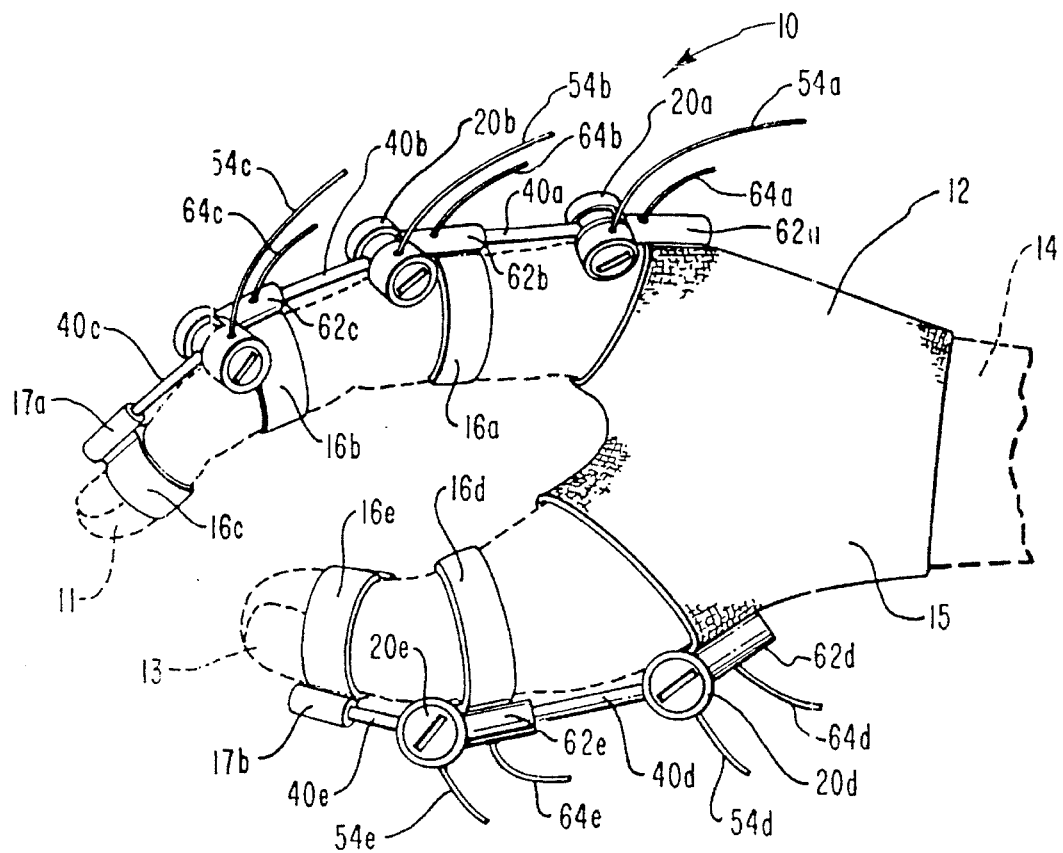
FIG. 1 is a perspective view of one embodiment of an exoskeletal control apparatus shown in the environment of a hand.

The invention is best understood from the following description with reference to the drawing wherein like parts are designated by like numerals throughout and in conjunction with the appended claims.

General Discussion

Robotic control of a remote device has long been known so that improvements have been made in these systems over the years. The present invention incorporates a novel kinesthetic feedback system into each control module on an exoskeletal framework so as to impart to the operator a tactile sensation that is representative of the forces or, more accurately, the resistance encountered by the remote device being selectively controlled through manipulation of the various control modules on the exoskeletal framework. A key element of each kinesthetic feedback device is a magnetostrictive material such as Terfenol-D. The magnetostrictive material provides the motive force for imposing a frictional force against further movement of a joint. The electrical energy to the magnetostrictive material is provided by a controller as a function of the resistive forces encountered by the robotic device.

Terfenol-D is the name designated for a preferred form of magnetostrictive material. Terfenol-D is an alloy of terbium, dysprosium, and iron. A rod of Terfenol-D experiences a significant degree of elongation under the influence of an electromagnetic field. Systems based on Terfenol-D require relatively low intensity magnetic fields and can be operated with small voltages as compared to piezoceramics. Terfenol-D has the further advantage of having a rapid response time (5 KHz) unlike shape memory alloys such as Nitinol and without the brittleness of piezoceramics because of its high modulus.

Each control module of this invention is configured with a kinesthetic feedback device which includes a rod of Terfenol-D surrounded by an electromagnetic coil. An optional permanent magnet can be placed at one end of the magnetostrictive rod to bias the magnetostrictive rod. The other end of the rod is placed in abutment against a clutch plate. The purpose of the clutch plate is to impart a frictional resistance against a moving joint of the exoskeletal framework which resistance is, in turn, sensed by the operator of the exoskeletal framework as a resistive force against further motion of that particular joint. The resistive force imposed on the joint is a function of the resistive force encountered upon movement of the remote device. Accordingly, each kinesthetic feedback device is configured to present to the operator a tactile sense to each operative element of the exoskeletal framework as a function of the resistive forces encountered by the corresponding operative element of the remote device.

Detailed Description

Referring now to FIG. 1, the novel exoskeletal control apparatus of this invention with kinesthetic feedback is shown generally as exoskeletal manipulator 10 and includes a plurality of control modules 20a–20e mounted to a glove framework 12 which is fitted to a hand 14. Glove framework 12 is provided with a glove-like configuration into which hand 14 can be inserted so as to enable hand 14 to selectively manipulate control modules 20a–20e as will be discussed more fully hereinafter. Importantly, glove framework 12 engages hand 14 with sufficient snugness to enable hand 14 to both accurately manipulate each of control modules 20a–20e as selectively predetermined by the operator (not shown) as well as suitably sense the kinesthetic feedback imparted to hand 14 through control modules 20a–20e. This is important since the primary function of exoskeletal control 10 is to accurately sense the motion of the respective joints of hand 14 with control modules 20a–20e in order to accurately manipulate a remote device such as an artificial hand 40 (FIG. 2), a backhoe 90 (FIG. 5), or such other device susceptible to being manipulated through signals received from exoskeletal control 10.

Glove framework 12 includes a basal element 15 configured to receive at least the palm portion of hand 14. Finger loops 16a–16e are designed to snugly engage the respective sections of the index finger 11 and thumb 13 of hand 14. Basal element 15 along with finger loops 16a–16e are preferably fabricated from an elasticized material such as Spandex so as to enable basal element 15 and finger loops 16a–16e to accommodate various sizes of hand 14.

Figure 2:
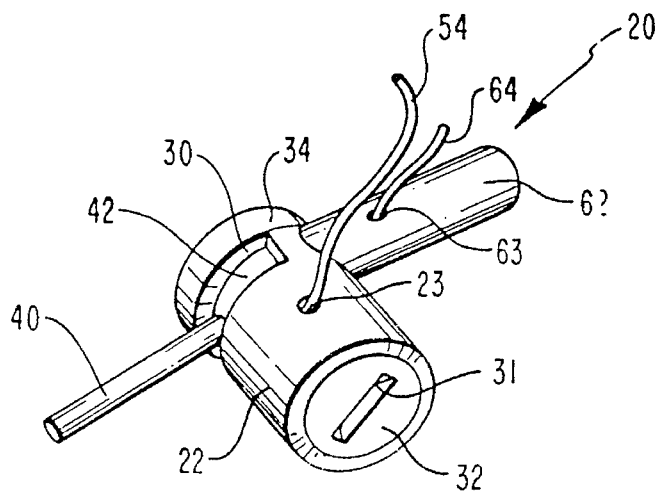
FIG. 2 is an enlarged, perspective view of one of the sensor modules of FIG. 1.
Figure 3:
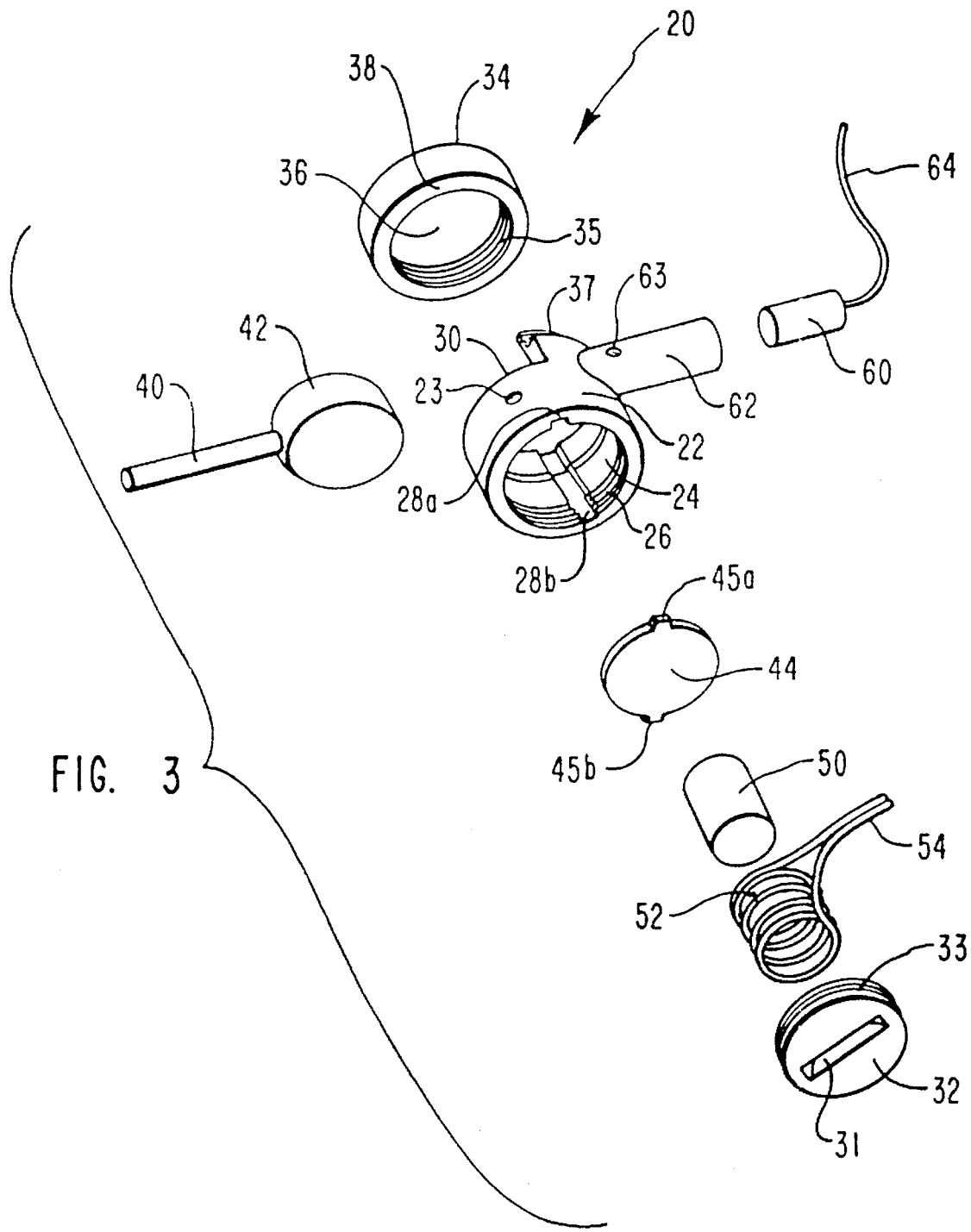
FIG. 3 is an exploded, perspective view of the sensor module of FIG. 2.

Referring now also to FIGS. 2 and 3, a control module identical to each of control modules 20a–20e is shown generally at 20 and also greatly enlarged for ease of illustration. FIG. 3 shows control module 20 in an exploded, perspective view in order to more fully describe its various features. Control module 20 includes a cylindrical housing 22 having an internal cavity 24 with threads 26. A pair of diametrically opposed, longitudinally oriented keyways 28a and 28b are formed in the wall surface of internal cavity 24. The proximal end of housing 22 is closed by an end plug 32 while the distal end of housing 22 is closed by an end cap 34. A cut out portion of the sidewall of housing 22 adjacent end cap 34 forms a side port 30, the function of which will be discussed more fully hereinafter. End plug 32 includes a slot 31 for engagement of a screwdriver (not shown) therein and threads 33 which threadedly engage corresponding threads 26 in the proximal end of housing 22. Correspondingly, end cap 34 includes threads 35 which threadedly engage corresponding threads 37 in the distal end of housing 22. End cap 34 includes a bearing face 36 which forms an abutment surface interiorly in housing 22. End cap 34 also includes an annular rim 38 which forms one edge of side port 30 when threads 35 of end cap 34 are threadedly engaged to threads 37 of housing 22.

Side port 30 is configured as an arcuate slot in a portion of the sidewall of the distal end of housing 22. A lever arm 40 is operable to move arcuately in a plane orthogonal to the axis of housing 22. Lever arm 40 is mounted to an edge of a lever body 42 having a short, cylindrical profile and adapted to being retained inside housing 22 with lever arm 40 extending outwardly through side port 30. The thickness of lever body 42 is incrementally wider than the width of side port 30 so as to provide secure retention of lever body 42 inside housing 22 when end cap 34 is mounted thereto. Additionally, the diameter of lever arm 40 is incrementally smaller than the width of side port 30 to allow for limited arcuate movement of lever arm 40 arcuately about the axis of control module 20.

A thrust plate 44 includes a pair of outwardly extending keys 45a and 45b which are designed to engage the corresponding keyways 28a and 28b, respectively, in housing 22. Thrust plate 44 is configured to be pressed against lever body 42 with keys 45a and 45b preventing rotational movement of thrust plate 44. A magnetostrictive rod 50 is encircled by an electromagnetic coil 52 and is mounted coaxially in housing 22. Electromagnetic coil 52 includes wires 54 which extend outwardly from housing 22 through a hole 23. End plug 32 encloses magnetostrictive rod 50 inside housing 22 while simultaneously serving to adjustably predetermine the spatial relationship of thrust plate 44 to lever body 42. In particular, elongation of magnetostrictive rod 50 is designed to push thrust plate 44 against lever body 42 and thereby frictionally engage lever body 42 between thrust plate 44 and bearing face 36 of end cap 34.

A lateral tube 62 is mounted to the side of housing 22 and provides a number of useful features to control module 20. Lateral tube 62 is a hollow, cylindrical tube that opens into interior 24 of housing 22 at a position juxtaposed to lever body 42. A position sensor 60 is mounted inside lateral tube 62 where it can sense the position of lever body 42 and, therefore, the position of lever arm 40. A conductor 64 extends outwardly through a hole 63 in lateral tube 62 when position sensor 60 is mounted inside lateral tube 62.

Lateral tube 62 also serves as an anchoring system for securing control module 20 to glove framework 12. Additionally, lateral tube 62 slidingly receives the lever arm 40 of the adjacent control module 20 thereby allowing exoskeletal control 10 to compensate for variations in length as control modules 20a–20e are flexed across the respective joints of hand 14 as will be described more fully hereinafter. Lateral tube 62 is configured to be mounted to hand 14 in such a position as to place housing 22 in juxtaposition with the adjacent joint of hand 14 thereby enabling lever body 42 to more closely mimic the relative motion of the respective joint of hand 14.

The flexure of the various joints of hand 14 is sensed by the respective position sensor 60 (FIG. 3) in each of the lateral tubes 62a–62e of the respective control modules 20a–20e. This change in position is created when the respective lever arm 40a–40e rotates its lever body (lever body 42, FIG. 3). This rotation is sensed by position sensor 60, and the resulting signal is transmitted through the respective sensor lead 64a–64e to controller 80 (FIGS. 4 and 5) where it is suitably processed and directed to the appropriate actuator on the respective robotic device (robotic hand 70, FIG. 4) or (backhoe 90, FIG. 5).

Flexure of hand 14 pivotally rotates the respective lever arm 40a–40e about their respective axes creating the foregoing signals through signal leads 64a–64e. Since movement of each joint of hand 14 creates an increase in the spatial separation between the respective control modules 20a–20e, lateral tubes 62b, 62c, and 62e slidingly engage lever arm 40a, 40b, and 40d, respectively. Finger loops 16c and 16e include slide tubes 17a and 17b, respectively, which slidingly receive lever arms 40c and 40e, respectively, to engage the same to finger 11 and thumb 13, respectively. Lateral tubes 62a and 62d do not have lever arms slidingly engaged therein since control modules 20a and 20d are not joined to another control module on that side.

Figure 4:
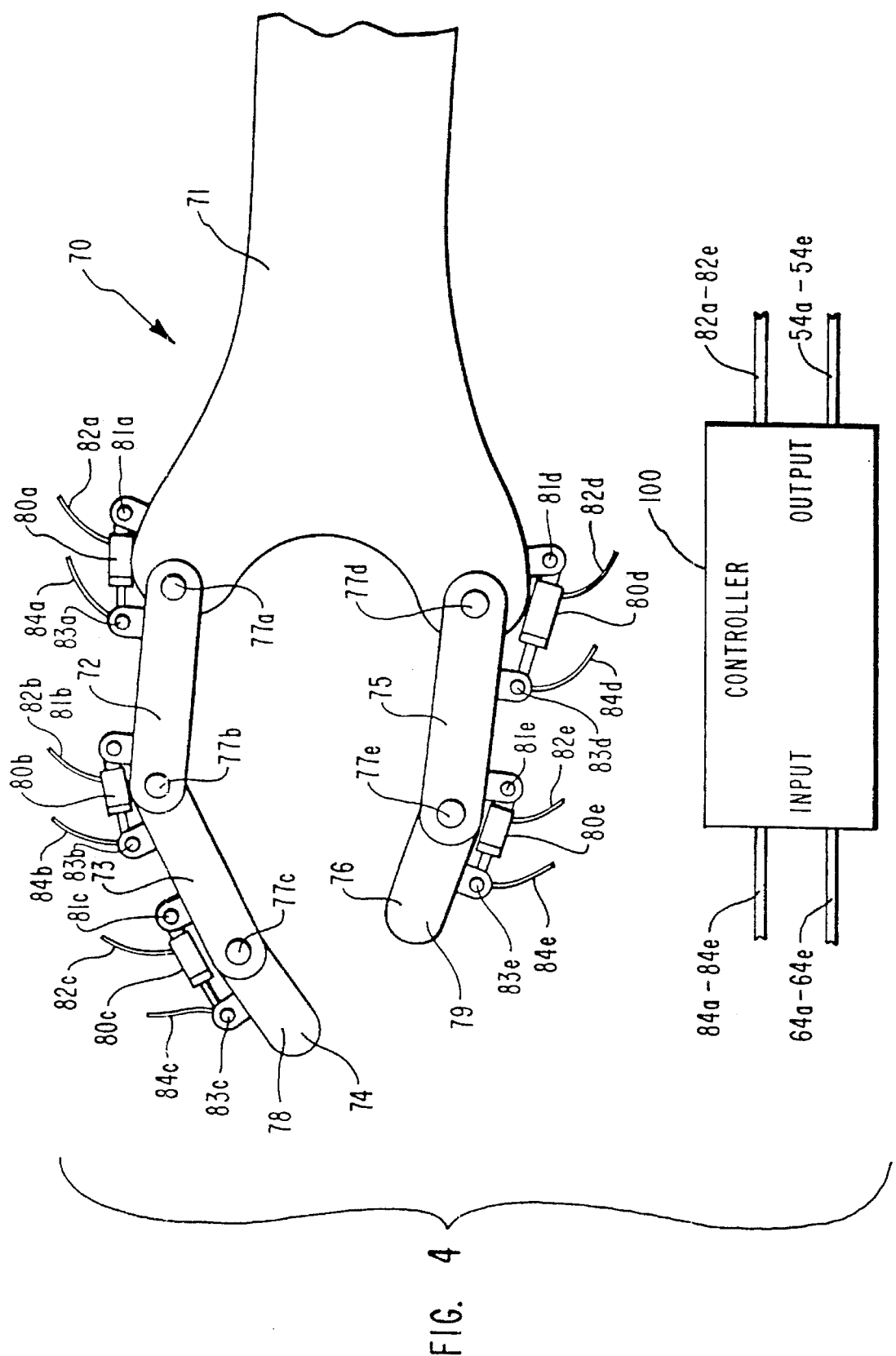
FIG. 4 is a side elevation of a schematic of a robotic hand and a controller.

Referring now to FIG. 4, robotic hand 70 is shown as a highly stylized, schematic robotic hand 70 having a finger 78 and a thumb 79 extending from a hand section 71. Finger 78 includes a first finger segment 72 while thumb 79 includes a first thumb segment 75 each of which are pivotally mounted hand section 71. Additional finger segments, second finger segment 73 and third finger segment 74, are pivotally mounted end-to-end, respectively, to first finger segment 72. Correspondingly, a second thumb segment 76 is pivotally mounted to the end of first thumb segment 75. Pivots 77a–77e, respectively, pivotally mount each of finger segments 72–74 and thumb segments 75 and 76 to hand section 71 and to the adjacent finger or thumb segment.

All of pivots 77a–77e operate in a single plane so that the arcuate movement of first finger segment 72 is coplanar with the plane of hand section 71. Correspondingly, all of finger segments 72–74 and thumb segments 75 and 76 are configured to be operated essentially coplanar with hand section 71. This feature enables robotic hand 70 to grasp an item (not shown) between the various elements of finger 78 and thumb 79.

Clearly, of course, robotic hand 70 is shown highly stylized for ease of illustration and discussion. Accordingly, the basic functional features illustrated thereon are for illustrative purposes only with the understanding that the actual operational devices may have a different appearance although the functioning will be essentially as described herein.

A plurality of actuators 80a–80e are mounted to robotic hand 70 across pivots 77a–77e, respectively, so as to provide the necessary motive force for pivotal movement of the respective elements at that particular pivot. For example, actuation of actuator 80a pivotally moves first finger segment 72 about pivot 77a and relative to hand section 71. Actuators 80a–80e are identical having identical operating features and can be hydraulic pistons, solenoids, or any other suitable device for producing a linear actuating force in both the forward and reverse directions. Actuators 80a–80e operate between two raised pivots 81a–81e and 83a–83e, respectively. A pressure sensor is incorporated into each of raised pivots 83a–83e with the signal therefrom being transmitted to a controller 100 through sensor leads 84a–84e, respectively.

Controller 100 also includes control leads 82a–82e which transmit the respective control signals to each of actuators 80a–80e to cause them to individually elongate or retract as a function of the respective control signal from control modules 20a–20e (FIG. 1) respectively. For example, a control signal transmitted through control lead 82a instructing actuator 80a to elongate results in an elongation of actuator 80a with corresponding pivotal movement of first finger segment 72 about pivot 77a. Resistive forces encountered by first finger segment 72 are sensed by the sensor in raised pivot 83a and the resistive signal generated thereby is transmitted through signal lead 84a to controller 100. Controller 100 relays a signal corresponding to the resistive signal through lead 54a (FIG. 1) to electromagnetic coil 52 (FIG. 3) where a corresponding resistive force is generated thereby as discussed herein before. The operative control signals through control leads 82a–82e are received by controller 100 through control leads 64a–64e, respectively, from control modules 20a–20e, respectively.

Referring now to both FIG. 4 and FIG. 1, each movement of finger 11 and thumb 13 is sensed by control modules 20a–20e with the movement thereof being transmitted through leads 64a–64e to controller 100. Controller 100 transmits corresponding signals to actuators 80a–80e, respectively, so that the individual movements of control modules 20a–20e are replicated by actuators 80a–80e. Advantageously, resistive forces encountered upon movement of actuators 80a–80e are sensed by the sensors at raised pivots 83a–83e with the signals generated thereby being directed by controller 100 back to control modules 20a–20e, respectively, where these signals are used to generate resistive forces against further movement of lever arms 40a–40e of control modules 20a–20e. These resistive forces are tactilely sensed by finger 11 and thumb 13 to thereby provide the user of exoskeletal manipulator 10 with the appropriate kinesthetic feedback.

Figure 5:
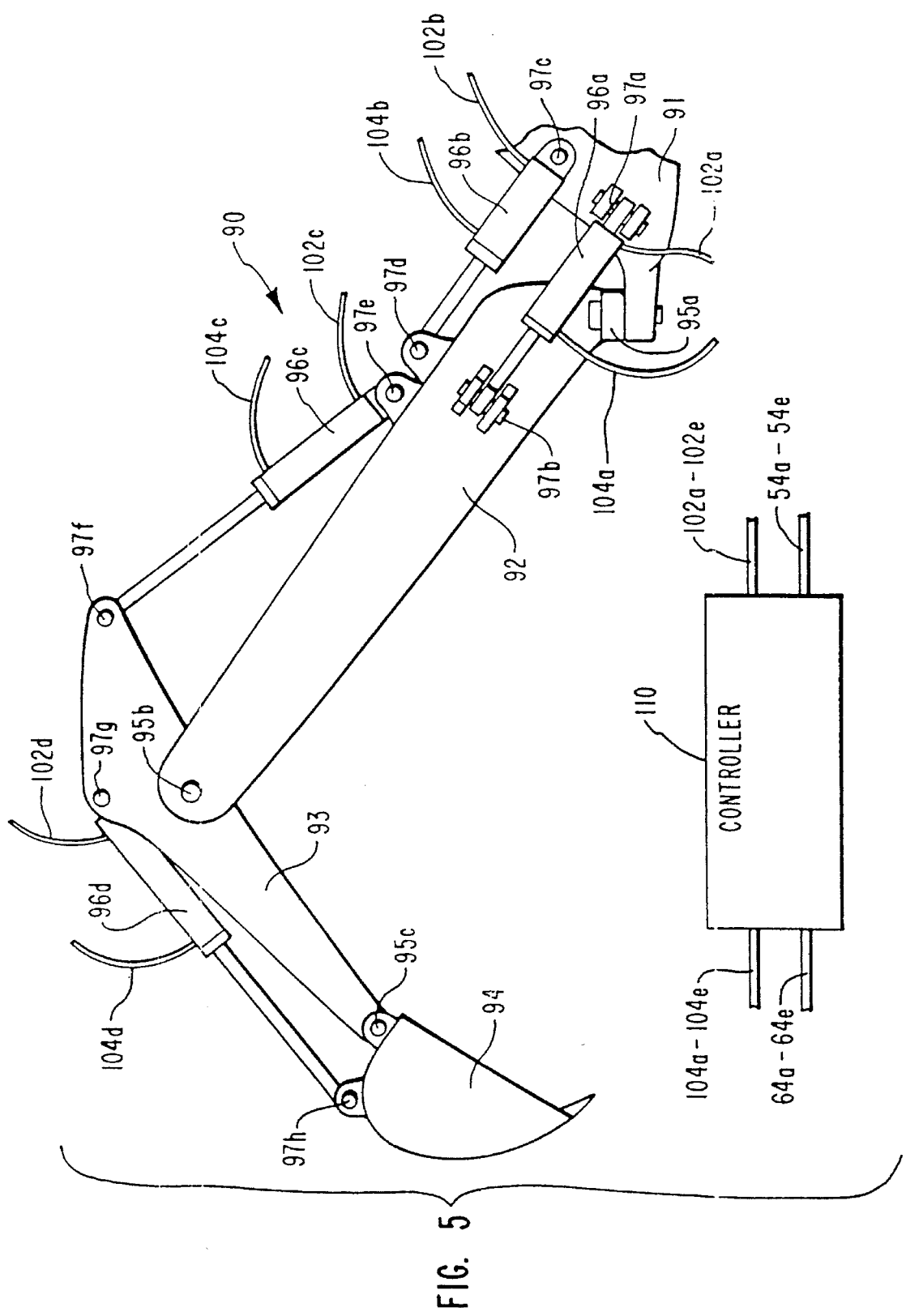
FIG. 5 is a side elevation of a backhoe and a controller.

Referring now to FIG. 5, a conventional backhoe is shown generally at 90 and includes a support beam 92 pivotally mounted at its proximal end to a frame 91 at a beam pivot 95a. An arm 93 is pivotally mounted to the distal end of support beam 92 at an arm pivot 95b while a bucket 94 is pivotally mounted to an end of arm 93 at a bucket pivot 95c. A plurality of hydraulic pistons 96a–96d selectively manipulate each of support beam 92, arm 93, and bucket 94 to achieve the desired operation of backhoe 90. For example, hydraulic piston 96a is pivotally interconnected between frame 91 and support beam 92 at pivot supports 97a and 97b, respectively. Hydraulic piston 96a pivotally moves support beam 92 laterally about beam pivot 95a to swing bucket 94 arcuately to the left and right, the direction depending upon whether hydraulic piston 96a is extended or retracted.

Support beam 92 is raised and lowered by the selective control of hydraulic piston 96b. Hydraulic piston 96b is pivotally interconnected between frame 91 and support beam 92 by pivot supports 97c and 97d, respectively. Support beam 92 is pivotally connected to frame 91 for up and down pivotal movement by a corresponding pivot (not shown) behind beam pivot 95a so that extension of hydraulic piston 96b lowers support beam 92 and retraction of hydraulic piston 96b raises support beam 92.

Arm 93 is moved arcuately about arm pivot 95b by the selective extension and retraction of a hydraulic piston 96c which is pivotally interconnected between support beam 92 and the end of arm 93 by pivot supports 97e and 97f, respectively. Extension of hydraulic piston 96c moves arm 93 arcuately downward toward frame 91 while retraction of hydraulic piston 96c extends arm 93 into a position that is generally coextensive with support beam 92.

Correspondingly, bucket 94 is moved arcuately about bucket pivot 95c upon extension and retraction of hydraulic piston 96d which is pivotally interconnected between arm 93 and bucket 94 by pivot supports 97g and 97h, respectively. Extension of hydraulic piston 96d moves bucket 94 in a digging motion toward support beam 92 while retraction of hydraulic piston 96d moves bucket 94 into an inverted orientation for dumping the contents therefrom.

Extension of hydraulic pistons 96a–96d is accomplished by directing hydraulic pressure through each of extension hydraulic lines 102a–102d, respectively. Retraction of hydraulic pistons 96a–96d is accomplished by directing hydraulic pressure through each of retraction hydraulic lines 104a–104d, respectively. Clearly, of course, the hydraulic pressure in each of hydraulic pistons 96a–96d is suitably balanced at all times between extension hydraulic lines 102a–102d and retraction hydraulic lines 104a–104d in order to maintain the structural configuration of all of support beam 92, arm 93, and bucket 94 with respect to frame 91. Selective movement of any of these structural elements is accomplished through the use of a controller 110 which selectively directs the appropriate increases and decreases in the hydraulic pressure in the preselected extension hydraulic lines 102a–102d and retraction hydraulic lines 104a–104d so as to achieve the desired movement of any of these structural elements.

Resistive forces encountered by each of support beam 92, arm 93, and especially bucket 94 are sensed by controller 110 as a function of changes in the pressure differentials between the respective pairs of extension hydraulic lines 102a–102d and retraction hydraulic lines 104a–104d. The signals represented by these resistive forces are processed by controller 110 and transmitted back to exoskeletal manipulator 10 (FIG. 1) via feedback lines 54a–54e to provide the novel kinesthetic feedback system of this invention. Correspondingly, control signals are initiated by movement of control modules 20a–20e on exoskeletal manipulator 10 which control signals are transmitted via control lines 64a–64e to controller 110 where they are translated into the appropriate hydraulic pressures for each of extension hydraulic lines 102a–102d and retraction hydraulic lines 104a–104d to thereby enable robotic hand 10 to suitably control backhoe 90 and to receive kinesthetic feedback therefrom through control modules 20a–20e.

The Method

The method of this invention involves the selection of an exoskeletal framework such as a glove framework 14 and affixing at least one control module 20 thereto. Control module 20 is mounted over the predetermined joint in either finger 11 or thumb 13 so as to enable control module 20 to sense relative movement of the particular joint to which it is affixed. Movement of the joint moves lever arm 40 in an arcuate path causing lever body 42 to rotate inside housing 22. This rotary motion of lever body 42 is sensed by position sensor 60 which transmits a control signal to either controller 100 or controller 110. This control signal is processed in controller 100 or controller 110 and then relayed through control lines 82a–82e or control lines 102a–102e, respectively, to control the movement of the respective robotic device, robotic hand 70 or backhoe 90.

Importantly resistive forces encountered by either robotic hand 70 or backhoe 90 are sensed by sensors 83a–83e or the sensor system of controller 110, respectively, with the corresponding resistive signals being transmitted through wires 54a–54e to the respective electromagnetic coil 52 in each of control modules 20a–20e. The resistive signal energizes electromagnetic coil 52 causing magnetostrictive rod 50 to elongate. Elongation of magnetostrictive rod 50 pushes against thrust plate 44 to constrict the rotational motion of lever body 42 and, therefore, the arcuate movement of lever arm 40. Restriction of the arcuate movement of lever arm 40 is sensed tactilely by the corresponding appendages of hand 14 thereby providing the novel kinesthetic feedback system of this invention. The degree to which lever body 42 is restricted in its rotational movement is a direct function of the resistive signal received by electromagnetic coil 52.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A control apparatus having kinesthetic feedback comprising:

first sensor means for sensing relative movement of a human appendage, said first sensor means producing a first signal as a function of said relative movement, said first sensor means comprising a lever pivotally mounted at a pivot to the human appendage so that movement of the human appendage causes a corresponding movement of said lever, said first sensor means further including a sensor on said pivot for sensing rotation of said pivot, said sensor producing said first signal;

mounting means for mounting said first lever to the human appendage;

an actuator located a distance from said first sensor means;

first processor means for processing said first signal and transmitting said first signal to said actuator, said first processor means driving said actuator as a function of said relative movement of the human appendage;

resistive means mounted to said mounting means for imparting a kinesthetic feedback to the human appendage, said resistive means comprising a clutch means on said pivot, said clutch means comprising a clutch actuator for resisting movement of said lever;

second sensor means for sensing a resistive force encountered by said actuator upon movement of said actuator, said second sensor means producing a second signal;

second processor means for transmitting said second signal to said resistive means, said second signal means causing said resistive means to impart said kinesthetic feedback to the human appendage, said kinesthetic feedback being a function of said resistive force; and a magnetostrictive rod driven by said second signal, said magnetostrictive rod being coupled to said clutch means to operate said clutch actuator as a function of said second signal.

2. The control apparatus defined in claim 1 wherein said control apparatus includes a plurality of first sensor means, each of said plurality of first sensor means being mounted to a separate portion of the human appendage by said mounting means so that each of said plurality of first sensor means is driven independently by the human appendage.

3. The control apparatus defined in claim 2 wherein said control apparatus includes a plurality of said actuators and corresponding resistive means, each of said plurality of actuators including a second sensor means for generating a plurality of second signals, said plurality of said second signals connected to said second processor means for transmitting said second signals to said corresponding plurality of said resistive means for creating a plurality of kinesthetic feedback to the human appendage.

4. A control apparatus operable by a human appendage and including kinesthetic feedback to the human appendage comprising:

a position sensor mounted to the human appendage for sensing motion of the human appendage, said position sensor producing a first signal as a function of said motion, said position sensor comprising a lever pivotally mounted on a pivot to the human appendage so that movement of the human appendage creates a corresponding movement of said lever, said position sensor including a movement sensor on said pivot for sensing said movement of said lever, said pivot including a clutch actuator on said pivot, said clutch actuator comprising said kinesthetic feedback by creating rotational resistance against said pivot, said rotational resistance being sensed by the human appendage as said kinesthetic sensation, said pivot comprising a housing having a disc pivotally mounted therein with said lever extending outwardly from said disc, said clutch including a pressure plate and a magnetostrictive rod in abutment with said pressure plate, said magnetostrictive rod pushing said pressure plate against said disc to impede rotational movement of said disc, said magnetostrictive rod being surrounded by an electromagnetic coil, said electromagnetic coil receiving said second signal to cause elongation of said magnetostrictive rod, said elongation being a function of said second signal;

an actuator at a remote location from said position sensor, said actuator being driven in response to said first signal;

a resistance sensor for sensing resistive forces encountered by said actuator as said actuator is being driven in response to said first signal, said resistance sensor producing a second signal as a function of said resistive forces; and a kinesthetic feedback on said position sensor said kinesthetic feedback being operable by said second signal to impart a kinesthetic sensation to the human appendage as a function of said second signal.

5. The control apparatus defined in claim 4 wherein said housing includes said position sensor mounted in abutment to said disc, said position sensor sensing the rotational movement of said disc to produce said first signal as a function of said rotational movement.

6. A method for receiving a tactile sensation through a manipulation apparatus, the tactile sensation being representative of a resistive force encountered by a remote actuator controlled by the manipulation apparatus comprising the steps of:

preparing a position sensor for sensing changes in the relative position of a lever arm mounted to a joint of a human appendage, said position sensor sending position signals as a function of changes in said relative position;

mounting said position sensor to the human appendage;

moving the appendage thereby causing said position sensor to send position signals;

controlling movement of said remote actuator with said position signals from said position sensor;

sensing resistive forces encountered by said remote actuator during said movement;

producing a resistance signal as a function of said sensing resistive forces;

placing a magnetostrictive rod adjacent said lever arm, said magnetostrictive rod being surrounded by an electromagnetic coil;

transmitting said resistance signals to said coil; and extending said magnetostrictive rod with said resistance signals causing a retarding movement of said lever arm by the human appendage thereby providing a tactile sensation to the human appendage as a function of said resistive forces.

7. The method defined in claim 6 wherein said preparing step further includes preparing a plurality of said position sensors and said mounting step comprises mounting each of said position sensors to different joints of the human appendage, the human appendage being a human hand and the joints being on fingers of the hand.

8. The method defined in claim 7 wherein said mounting step comprises preparing a glove-like assembly and attaching each of said position sensors to preselected locations on said glove-like assembly thereby placing each of said position sensors over preselected joints of the hand.

9. The method defined in claim 6 wherein said extending step comprises resisting movement of said lever joint of said position sensor by applying a braking action on said lever joint.

10. The method defined in claim 9 wherein said placing step comprises obtaining said magnetostrictive rod and placing said magnetostrictive rod in contact with said lever arm and surrounding said magnetostrictive rod with said electromagnetic coil, said transmitting step including directing said resistance signals to said electromagnetic coil thereby causing said magnetostrictive rod to create said braking action on said lever arm, the human appendage sensing said braking action as a function of said resistive forces encountered by said remote actuator.

* * * * *